United States Patent [19]

Hara et al.

[11] Patent Number: 5,153,539
[45] Date of Patent: Oct. 6, 1992

[54] MAGNETIC CORE FOR A SIGNAL LINE FILTER

[75] Inventors: Hideo Hara; Hikohiro Togane; Toshihiko Mori, all of Sagamihara, Japan

[73] Assignee: Mitsubishi Denki Kabushiki Kaisha, Tokyo, Japan

[21] Appl. No.: 762,439

[22] Filed: Sep. 19, 1991

[30] Foreign Application Priority Data

Nov. 20, 1990 [JP] Japan ................................ 2-315072

[51] Int. Cl.$^5$ ...................... H04B 15/00; H01R 13/66
[52] U.S. Cl. .................................... 333/182; 333/185; 439/620; 336/175
[58] Field of Search ......................... 333/12, 181–185; 439/607–610, 620; 336/92, 175, 210, 211, 212, 216, 233

[56] References Cited

U.S. PATENT DOCUMENTS

| 4,329,665 | 5/1982 | Kawai et al. ................ 439/620 X |
| 4,784,618 | 11/1988 | Sakamoto et al. ............ 333/182 X |
| 4,822,303 | 4/1989 | Nakamura et al. ................ 439/607 |
| 4,961,711 | 10/1990 | Fujiura et al. ................ 439/610 X |
| 4,995,834 | 2/1991 | Hasegawa ..................... 333/182 X |

FOREIGN PATENT DOCUMENTS 62-171173  10/1987  Japan .

Primary Examiner—Eugene R. Laroche
Assistant Examiner—Seung Ham
Attorney, Agent, or Firm—Oblon, Spivak, McClelland, Maier & Neustadt

[57] ABSTRACT

A magnetic core for a signal line filter adapted to be assembled in a terminal connector for a signal line cable for connecting electronic devices to form a signal line filter, wherein the magnetic core is provided with pin insertion holes each having a tapered portion in the direction of thickness of the magnetic core, or tapered portions at both sides in the direction of thickness of the magnetic core.

4 Claims, 2 Drawing Sheets

FIGURE 1a
FIGURE 1b
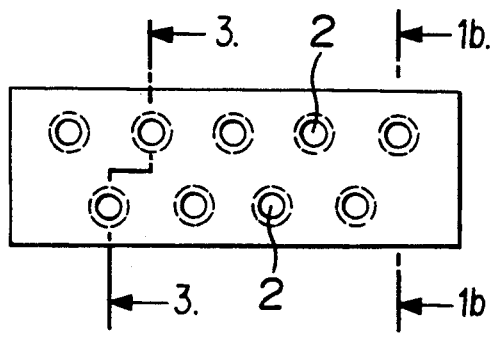
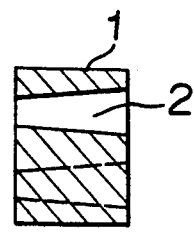
FIGURE 2a
FIGURE 2b
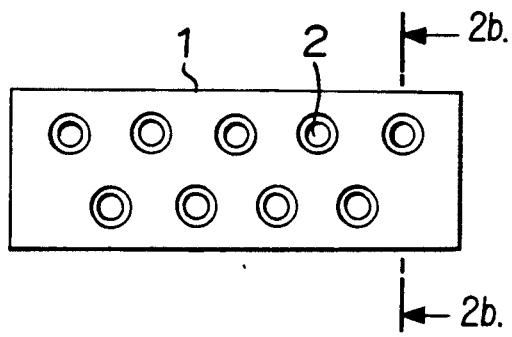
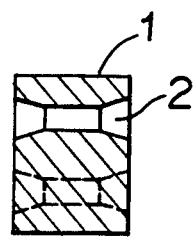
FIGURE 3
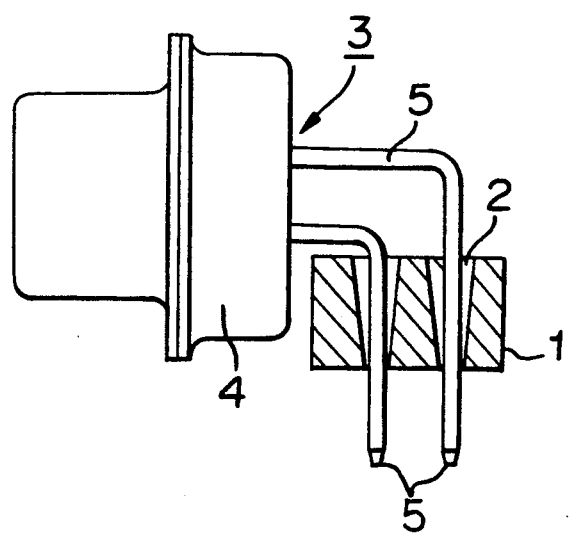

5,153,539

MAGNETIC CORE FOR A SIGNAL LINE FILTER

BACKGROUND OF THE INVENTION

1. Field of the Invention

The present invention relates to a magnetic core for a signal line filter which is adapted to be attached to a connector at a signal line cable terminal portion for connecting electronic devices to thereby form a signal line filter and to absorb noises transmitted through the signal line cable from the inside or the outside of the electronic devices.

2. Discussion of Background

There has been known, as a method of absorbing noises transmitted through the signal line cable, a technique to absorb such noises wherein a magnetic core such as ferrite or the like with a number of holes is connected to a terminal connector for the signal line cable to absorb noises by utilizing the high impedance characteristics possessed by the magnetic material.

FIG. 4a is a plane view showing a conventional magnetic core for a signal line filter, which is adapted to be attached to a connector, and FIG. 4b is a cross-sectional view taken along a line A—A view in FIG. 4a. A magnetic core 1 made of a magnetic substance such as ferrite or the like is provided with a large number of pin insertion holes 2 in the direction of thickness of the magnetic core. FIG. 5 is a cross-sectional view of the conventional magnetic core taken along a line B—B in FIG. 4a, which is attached to a connector to thereby form a signal line filter. In FIG. 5, reference numeral 3 designates a signal line filter in which connector pins 5 of a signal line connector 4 are inserted in the pin insertion holes 2 of the magnetic core 1. In the case that noises transmitted through the signal line cable are absorbed by using the magnetic substance such as ferrite or the like, the magnetic core 1 having the pin insertion holes 2 whose number is the same as that of the connector pins 5, is attached to the connector 4 at a signal line cable terminal portion so that a high impedance is produced. Since the impedance functions as a resistance component against a noise current, the magnetic core 1 absorbs the noises and discharges the noise energy as heat, whereby it serves as a signal line filter.

Thus, the signal line filter 3 is constituted by assembling the magnetic core 1 in the signal line connector 4. However, there has been a demand for miniaturizing the connector 4, with the result that the pitch between the connector pins 5 is small. Further, there has been tendency that the magnetic core is assembled in the connector having a large number of pins. Accordingly, it has been not easy to attach the magnetic core 1 to the connector 4. Therefore, it has been necessary to enlarge, as a whole, the diameter of the pin insertion holes 2 in order to facilitate the attachment of the magnetic core to the connector 4. As a result, there arose a problem that the noise absorbing effect became inferior.

SUMMARY OF THE INVENTION

It is an object of the present invention to eliminate the above-mentioned problem and to provide a magnetic core for a signal line filter which assures noise absorbing effect without enlarging, as a whole, the diameter of pin insertion holes of a magnetic core, and which is capable of make the attachment of the magnetic core to a connector easy.

The foregoing and other objects of the present invention have been attained by providing a magnetic core for a signal line filter adapted to be assembled in a terminal connector for a signal line cable for connecting electronic devices to form a signal line filter, wherein the magnetic core is provided with pin insertion holes each having a tapered portion in the direction of thickness of the magnetic core.

Further, the present invention is to provide a magnetic core for a signal line filter adapted to be assembled in a terminal connector for a signal line cable for connecting electronic devices to form a signal line filter, wherein the magnetic core is provided with pin insertion holes each having tapered portions at both sides in the direction of thickness of the magnetic core.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1a is a plane view of an embodiment of the magnetic core for a signal line filter according to the present invention;

FIG. 1b is a cross-sectional view taken along a line C—C in FIG. 1a;

FIG. 2a is a plane view showing another embodiment of the magnetic core for a signal line filter according to the present invention;

FIG. 2b is a cross-sectional view taken along a line D—D in FIG. 2a;

FIG. 3 is a front view showing a typical signal line filter in which the magnetic core according to the present invention is shown by a cross-sectional view taken along a line E—E in FIG. 1a;

FIG. 4b is a cross-sectional view taken along a line A—A in FIG. 4a; and

FIG. 5 is a front view showing a conventional signal line filter in which a conventional magnetic core is shown by means of a cross-sectional view taken along a line B—B in FIG. 4a.

DETAILED DESCRIPTION OF THE PREFERRED EMBODIMENTS

Figure 4A:
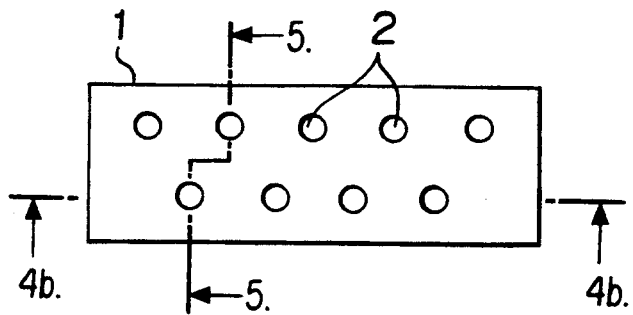
FIG. 4a is a plane view showing a conventional magnetic core.
Figure 4B:
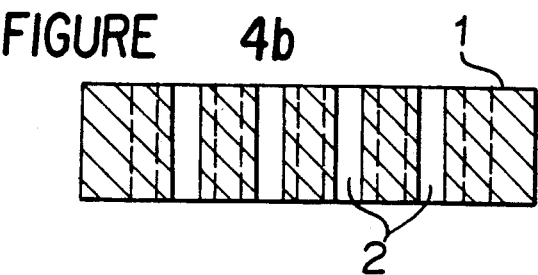
Figure 5:
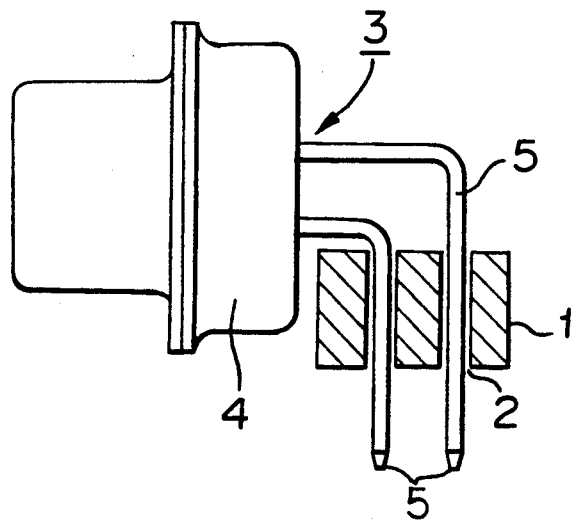

Referring now to the drawings, wherein like reference numerals designate the same or corresponding parts throughout the several views, and more particularly to FIGS. 1a and 1b thereof, there are shown a plane view and a cross-sectional view of an embodiment of the magnetic core with a number of holes for a signal line filter according to the present invention.

In FIG. 1, a magnetic core 1 made of a magnetic material such as ferrite is provided with a number of pin insertion holes 2 each having a tapered portion in the direction of thickness of the magnetic core 1 in order to facilitate the attachment of the magnetic core 1 to a signal line connector 4. Each of the pin insertion holes 2 is a through hole and the tapered portion is so formed as to be uniformly enlarged from an opening of each of the holes to the other opening.

FIG. 2a is a plane view showing another embodiment of the magnetic core 1 with a number of holes for a signal line filter according to the present invention, and FIG. 2b is a cross-sectional view taken along a line D—D in FIG. 2a. In FIGS. 2a and 2b, the magnetic core 1 is provided with the pin insertion holes 2 each having tapered portions at both sides in the direction of thickness of the magnetic core. Preferably, each of the pin insertion holes 2 has a straight cylindrical bore portion between the tapered portions at the both openings.

Ferrite is a magnetic material of oxide, and the magnetic core 1 of the ferrite is produced by a powdered metal technique. The process of producing the magnetic core 1 will be explained. Iron oxide, zinc oxide, nickel oxide, copper oxide and so on are weighed to have a predetermined formulation and they are mixed. Then, the mixture is subjected to granulation and is preliminary sintered at 800–900° C. followed by powdering. A binder is added to thus produced powder and the mixture is subjected to granulation. Thus formed granule is put in a metal mold to be subjected to powder sinter molding. The shaped product is baked at 1,000–1,200° C. Thus, there is obtainable the magnetic core 1 with the pin insertion holes 2 each having a tapered portion in the direction of thickness of the magnetic core 1 or the magnetic core 1, with the pin insertion holes 2 each having tapered portions at both sides in the direction of thickness of the magnetic core 1.

FIG. 3 shows a signal line filter provided with the magnetic core as shown in FIG. 1 in which the magnetic core is shown by means of a cross-sectional view taken along a line E—E in FIG. 1a.

The magnetic core 1 as shown in FIG. 1 is attached to the signal line connector 4 so that the connector pins are inserted in the pin insertion holes 2 from the large diameter portion of the holes, whereby the signal line filter 3 is formed.

The magnetic core 1 as shown in FIG. 2 is attached to the signal line connector 4 to form the signal line filter 3. In this case, the connector pins 5 can be inserted into the pin insertion holes 2 from either side of it because the tapered portions are formed at the both sides in the direction of thickness of the magnetic core 1.

Either of the magnetic cores 1 as shown in FIGS. 1 and 2 is adapted to be assembled with the connector 4 at the signal line cable terminal portion which is connected between electronic devices. Since the magnetic core 1 is provided with the pin insertion holes 2 each having the tapered portion in the direction of thickness of the magnetic core 1, or the pin insertion holes 2 each having tapered portions at both sides in the direction of thickness of the magnetic core 1, it is easy to insert the connector pins 5 in the insertion holes 2. The magnetic core 1 of the present invention has a larger core volume than a conventional magnetic core 1 having the pin insertion holes 2 which have uniformly enlarged diameter to thereby facilitate the insertion of the connector pins 5. Accordingly, in accordance with the present invention, a signal line filter 3 having excellent noise absorbing effect can be obtained.

In the above-mentioned embodiments, the pin insertion holes 2 and the connector pins 5 each having two row arrangement have been exemplified. However, the number of rows may be larger or smaller than that of the above-mentioned embodiments to obtain the same effect.

Thus, the magnetic core of the present invention is provided with pin insertion holes 1 each having a tapered portion in the direction of thickness of the magnetic core, or pin insertion holes each having tapered portions at both sides in the direction of thickness of the magnetic core. Accordingly, the magnetic core which provides a sufficient noise absorbing effect without reducing the core volume in comparison with the conventional magnetic core, and facilitates the attachments of the magnetic core to a connector.

Obviously, numerous modifications and variations of the present invention are possible in light of the above teachings. It is therefore to be understood that within the scope of the appended claims, the invention may be practiced otherwise than as specifically described herein.

What is claimed is:

1. A magnetic core for a signal line filter adapted to be assembled in a terminal connector for a signal line cable for connecting electronic devices to form a signal line filter, wherein said magnetic core is provided with pin insertion holes each having a tapered portion in the direction of thickness of the magnetic core.

2. The magnetic core for a signal line filter according to claim 1, wherein said pin insertion holes are through holes and said tapered portion is uniformly enlarged from an opening of each hole to the other opening.

3. A magnetic core for a signal line filter adapted to be assembled in a terminal connector for a signal line cable for connecting electronic devices to form a signal line filter, wherein said magnetic core is provided with pin insertion holes each having tapered portions at both sides in the direction of thickness of the magnetic core.

4. The magnetic core for a signal line filter according to claim 3, wherein said pin insertion holes have a straight cylindrical bore portion between said tapered portions at the both openings.

* * * * *